ARTIFICIAL KIDNEY

Filed Sept. 5, 1967 6 Sheets-Sheet 1

FIG I

INVENTOR.
JOHN F. LONTZ
HERMAN L. KUMME
BY
James P. Malone

ARTIFICIAL KIDNEY

INVENTOR.
JOHN F. LONTZ
HERMAN L. KUMME
BY James P. Malone

INVENTOR.
JOHN F. LONTZ
HERMAN L. KUMME
BY James P. Malone

INVENTOR.
JOHN F. LONTZ
HERMAN L. KUMME
BY James P. Malone

Nov. 26, 1968 J. F. LONTZ ET AL 3,412,865

ARTIFICIAL KIDNEY

Filed Sept. 5, 1967 6 Sheets-Sheet 5

INVENTOR.
JOHN F. LONTZ
HERMAN L. KUMME
BY
James P. Malone

INVENTOR.
JOHN F. LONTZ
HERMAN L. KUMME
BY
James P. Malone

United States Patent Office 3,412,865

Patented Nov. 26, 1968

3,412,865

ARTIFICIAL KIDNEY

John F. Lontz, 515 Eskridge Drive, Wilmington, Del. 19809, and Herman L. Kumme, 2312 Walnut Lane, Arden, Wilmington, Del. 19803

Continuation-in-part of application Ser. No. 411,407, Nov. 16, 1964. This application Sept. 5, 1967, Ser. No. 665,544

2 Claims. (Cl. 210—321)

ABSTRACT OF THE DISCLOSURE

An artificial kidney device comprising an arrangement having parallel plates with interior spaces. A pair of semipermeable membranes are mounted in parallel relation within the interior spaces, means to pass blood between the membranes, and means to pass dialyzing solution outside the membranes. The membranes are confined by the plate structure having interior grooved patterns. The pumping action is pulsating. A predetermined surface to volume ratio is maintained.

This application is a continuation in part of our prior application of the same title, Ser. No. 411,407, filed on Nov. 16, 1964, now abandoned.

This invention pertains to an improved and novel device for use in dialyzing systems and particularly for use in extracorporeal hemodialysis or what is more commonly called an artificial kidney. This present application relates to our copending U.S. application, Ser. No. 411,206, filed Nov. 16, 1964, which describes a complete, integrated system with devices for circulating the blood and the dialyzing solutions and for monitoring and regulating this circulation depending upon patient condition with a view to avoiding hemorraghic shock.

The functions of extracorporeal hemodialysis or artificial kidney are well known and have been subject to considerable discussion of success with acute and chronic kidney diseases, according to the numerous articles published in the Transactions of the Society for Artificial Internal Organs. In principle, the artificial kidney consists of a dialyzer through which the blood is made to flow in between one side of two separating semipermeable membranes usually made up from cellophane, the other side of which is bathed in a dialysis solution or dialysate into which toxic substances, principally nitrogenous waste products, diffuse. The blood comes from the patient into the dialyzer usually with mechanical pumping, as with the twin-coil dialyzer, circulates through the dialyzer in between the membranes separating the blood from the dialysis solution having essential electrolytes isotonic to that of the blood with the same osmolality and chemical composition as that of normal serum. The semipermeable membrane allows waste products to diffuse from the blood to the dialysis solution but does not permit high molecular weight proteins to go through.

The component part of the dialyzers currently in use comprise a variety of assemblies and constructions that include the twin-coil, parallel array of cut narrow tubing, and parallel plates using wide sheets of membranes. The twin-coil has several disadvantages notably a high trapped volume which when pumped to 300 millimeters mercury gauge pressure difference from one end of the coil to the other can amount to as high as 4 pints or 2,000 cubic centimeters of priming blood. With a 2 square meter (20,000 square centimeters) twin-coil this means that a surface-to-volume ratio (S/V), an indication of how thin a film of blood can be spread to two-sided membrane exposure, of only 20,000/2,000 or 10 to 1 is obtained: in other words, this provides an exposure of 10 square centimeters of blood surface per 1 cubic centimeter of blood volume, or as an S/V ratio of 10 reciprocal centimeters as used in this application. Ideally for most efficient dialysis this S/V ratio should be as high as possible, consistent with minimal impedance of flow and damage to blood. Any increase in this ratio would constitute an important advance in the design and the practice of extracorporeal dialysis particularly in reducing the volume of starting or priming blood. This ratio appears to have been completely overlooked in designing dialyzers in any of the above-mentioned twin-coil, parallel narrow tubular, and wide parallel plate types for use as artificial kidney. Ideally, a S/V ratio of 100 to 1 or more would be desirable which in our dialyzer would involve as little as 75 cubic centimeters trapped blood with a 7,500 square centimeter membrane area, counting both sides of the membrane in which the blood is contained, and this in fact has been approached in the dialyzer plate described in this invention. A surface-to-volume ratio starting from 20/1 as attained in our dialyzer does indeed make a surprisingly greater improvement as well as savings in required priming volume. Clinical evaluation of our dialyzer design has indeed demonstrated that 6,000 to 7,500 square centimeter membrane area preadjusted with the spacing and gasketing described later on traps only 140–200 cubic centimeters of blood and hence is seldom primed with whole blood, because most patients can easily spare this amount without any deleterious effect; this low trapped volume has proven particularly advantageous for animal studies without modifying the dialyzers. In some 40 clinical patient dialysis no whole blood has been used to prime the dialyzer described in this invention, whereas with the twin-coil this would require as much as 4 pints per treatment or a total of 160 pints of whole blood. The relative costs for this group of 40 clinical treatments, exclusive of ancillary tubing debubbles and other pertinent expenses, can be compared as follows:

| Item | Units per dialysis | Cost for 40 treatments | |
|---|---|---|---|
| | | Twin-coil | Dialyzer plate this invention |
| Twin coil, $53 ea | 1 | $2,120 | |
| Membrane, $2 ea | 1 | | $80 |
| (a) Whole blood $25/pt | 4 | 4,100 | |
| (b) Same, allowable (NB) | 1 | | 1,000 |
| Total by— | | | |
| (a) | | $6,120 | $80 |
| or | | | or |
| (b) | | | $1,080 |

NB. This is to take care of instances where whole blood is kept at stand-by especially with initial dialysis.

Thus by using the dialyzer plate of this invention in lieu of the twin-coil a substantial cost saving has been effected. More significantly another highly important advantage has been added, namely minimizing and even eliminating the risk of chance hepatic infection which always presents itself as a possibility where large number of blood units are administered; such infection can be detrimental if not fatal to the patient.

Although various parallel plates have been designed and used in clinical treatment, numerous shortcomings have become evident. Sometimes referred to as dialyzer boards these are made of either epoxide resins or polypropylene. These materials have been found to fail in dialysis for several reasons. One of these is the fact that the rigidity is built in so to speak by thick sections using conventional molding techniques. When subjected to repeated assembling and disassembling they begin to warp and lose much of the critical tolerances. In the case of the epoxy resin boards this is largely due to continued shrinkage since post-curing goes on relentlessly along with absorptions and deabsorption of water causing expansion and contraction, thus throwing the various design components out of line. In the case of the polypropylene boards, the molding schedule leaves a heterogeneous array of strained regions due to variations in thermal contours and to an internal zone that usually has a higher crystallinity content and hence different levels of elastic constants. With frequent assembly and disassembly along with variable exposure to hot and cold water, these boards warp and distort and then start a chain of nuisances and problems. First among this is an inadequate, nonuniform sealing of the applied semipermeable membranes caused by edge-warping causing frequent leakage of the blood to the outside which makes the dialysis liable to bacterial contamination that could get into the patient's blood stream and cause grave consequences. Generally the warping is corrected by using massive bolting arrangements lending a cumbersome appearance and functioning of the dialyzer; but frequently the warping may be too severe to be even corrected by such bolting. Secondly, the warping develops not only edgewise but toward the center of the boards so that when assembled large areas of complete contact of the boards develop thus excluding the blood from the rated coverage of the surface area; a chance warpage at the inlet or outlet just about terminates the usefulness of the boards by restricting and even stopping the blood flow. This is usually corrected in three ways, none of which is simple and imposes additional assembling problems: (a) using internal gaskets down the line of flow, but this causing preferential channeling and much stagnation so that only a minor part of the rated surface is used; (b) using larger diameter gaskets as the warping develops, but this increases the trapped volume and goes in the wrong direction as far as the desirable surface-to-volume ratio is concerned; and (c) using two, three, and four pairs of superimposed membranes with manifold inlets and outlets, but this leads again to increased trapped volume and worse, preferential flow that is very sensitive to changes in viscosity either by miniscular difference in temperature between the superimposed plates or by accumulating variations in blood solids. In this invention, these problems and disadvantages have been effectively circumvented by developing and designed hollow dialyzer enclosure plates that comprise relatively thin inner and outer sides rigidized not by thickness but by a predesigned arrangement of stiffening ribs described later on. Thus, the usual warpage from relatively massive, heavy plastic boards is eliminated. Moreover, while the skeletal structure is thus rigidized, the openings permit a flexible substructure that can take up any incidental dimensional changes rather than extending them from one end of the board to the other. Somewhat unexpected was the observation that the regions between the ribbed structure could easily deflect or undulate as the dialysis pumping action underwent intermittent phases, thereby imposing a pulsating motion to the blood, which begins to replicate to some degree the physiological pulsations which in turn impart various turning and tumbling of the flowing blood in the dialyzer which helps to prevent stagnation resulting with the rigid boards. Additionally, the hollow enclosures reinforced with the ribbed structure have proven to be an effective heat trap thus dispensing with any need for cumbersome heat exchanges to warm the blood to the required physiological temperature; heat exchanges can prove hazardous if runaway temperatures are not guarded against and besides trap additional volume of circulating blood.

Besides functioning as a dialyzer for the movement of toxic or undesirable substances across the membrane from the blood to the dialyzing solution, a hemodialyzer should be constructed to provide for ultra filtration or movement of water across the membrane from the blood in cases of pulmonary edema or congested heart problems. It is therefore desirable to apply as great a pressure difference as possible between the blood and the membrane so as to force the water to the dialysis solution. In the twin-coil this is done to only a very limited extent by partially constricting the outlet blood tube while pumping the arterial blood into the coil to usually about 200 mm. Hg pressure difference but seldom above 300 mm. Hg beyond which leaks develop often with extensive rupture of the coil membrane. In effect, the blood is given a superficial, positive pressure greater than atmospheric or what is known as hyperbaric condition that can lead to increased solubility or retention of blood carbon dioxide. In the case of the parallel plate dialyzers of the usual type a hypobaric condition can be imposed by virtue of the vacuum such as is applied to move or lift the dialysis fluid from one end of the dialyzer to the other by means of a suction pump; under such conditions the carbon dioxide is thus expelled from the blood. The vacuum imposed in the parallel plate dialyzer can be regulated by constricting not the blood flow but the flow of the dialysis solution at the inlet end as the fluid enters the dialyzer. Usually a vacuum of up to 200 millimeters mercury gauge can be imposed and occasionally up to 300 millimeters mercury gauge vacuum but with much risk to the collapse of the dialyzing boards which would result in restricting the flow of the blood and extensive leakage of blood at the pinched off places. In the present invention, these problems of leak and flow restricting have been minimized and eliminated by ribbed rigidized hollow enclosures, acting to dimensionally stabilize the parallelity of the plates, and the flexible inter-rib planes which can undulate and pulsate with the action of the suction pump. In actual practice and with the preadjusted spacing of the perimeter with respect to the gasketting and grooving to be described in ensuing description details, the dialyzer of this invention provides a major significant improvement by permitting a surprisingly high gauge vacuum up to 700 millimeters mercury gauge, which is far beyond any attained by previous designs. Thus, the ultrafiltration capacity per given square area is enhanced by at least twice any attainable by present parallel plate dialyzers. In clinical sense, this is important and can be critical to urgent situations where edema and congestive conditions demand rapid removal of excess fluid, notably water.

Accordingly, it is the object of this invention to provide a compact, efficient and versatile dialyzer for use in hemodialysis and in particular as an artificial kidney in which the blood shunted from a patient or animal flows in a parallel, thin film with a high surface-to-volume ratio of at least 20 to 1. Another object of this invention is to provide this dialyzer with a dimensionally stable arrangement of hollow plates sufficiently rigid to assure minimum resistance to the coursing blood stream and to have it undulate across a semipermeable membrane to which predetermined wave or groove patterns are imposed. Still another object of this invention is to provide a versatile pumpless dialyzer through which the blood courses under its own arterial pressure or autogenic conditions. Still another object of this invention is to provide a pumpless dialyzer having compartmented flexible regions which can undulate under the pulsating action of a suction pump as it draws away the dialysis. Still another object of this invention is to provide a pumpless dialyzer in which the hollow rigidized enclosure plates serve as a heat loss barrier to minimize or eliminate the need for any supplemental warming or otherwise thermally regulating the blood during dialysis. These and other objects will become evident from the ensuing descriptive details.

In this invention the versatility comprises several functionally important features that have been uniquely adapted into a composite dialyzer that include maximum surface-to-volume ratio with minimum resistance to the flow of blood while at the same time making provisions for undulating and pulsating flow of the blood, confined in an insulating enclosure to minimize heat loss and made structurally rigid and tight to permit dialysis under a gauge vacuum up to at least 700 millimeters mercury from atmospheric.

Figure 1:
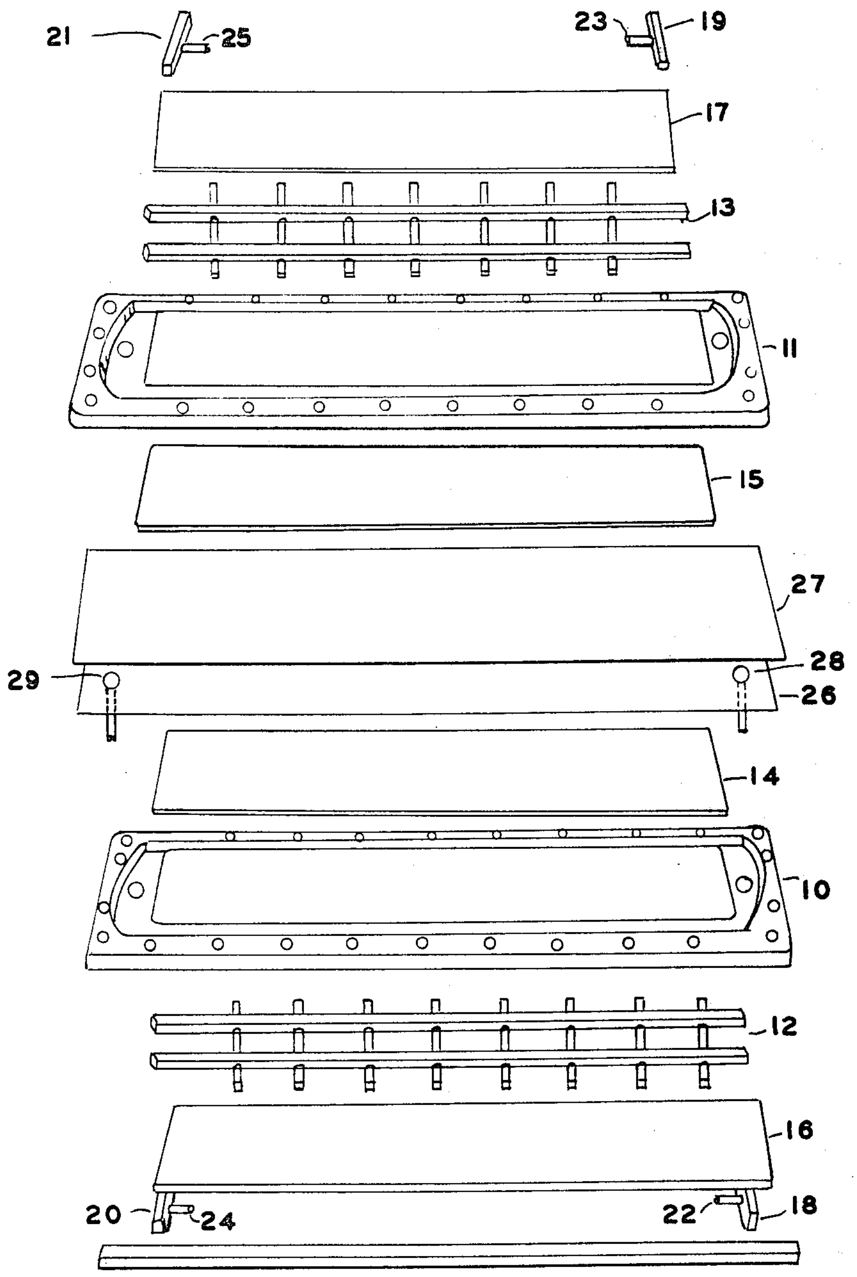
FIGURE 1 is a distended view of the component parts of the dialyzer that can be made as separate parts or as combinations cemented together, fused or welded by appropriate methods.

Referring to FIGURE 1, the arrangement consists of rigid plate frames 10 and 11, hereafter designated as components of a bottom and top plate, respectively, in which rigid strut members 12 and 13 are interposed within the hollow space covered in the inner dialysis side by pattern plates 14 and 15 of various designs as described later on, and by cover plates 16 and 17 on the top and bottom sides, cemented or otherwise connected to plates 10 and 11, to which are attached manifolding inlets and outlets 18, 19, 20 and 21 with connecting tubes 22–25; all components described so far are constructed from structural grade of polymethyl methacrylate or what is commonly known as acrylic plastic. Optionally, the identical assembled design is applicable to other rigid plastics such as polycarbonate resin, polypropylene, and other rigid materials such as aluminum and stainless. The transparent plastics are preferred because the operation of the dialysis can be viewed for any defective or occluded flow or for detection of leaks; one side, particularly the bottom plate, is suitably constructed from stainless steel as an optional or alternative feature. The component parts can be fabricated in combinations by conventional compression or injection molding and thus reduce the extent of cementing that is necessary to achieve the hollow construction. The hollow construction, which required the multiplicity of component parts, is a vital aspect of this invention in the practice of efficient dialysis in that it provides a pulsating displacement imposed by the dialysis pump described in our above-mentioned copending application, and additionally serves as an insulating structure or a heat trap minimizing excessive lowering of blood temperatures during the extracorporeal circulation. With such a pulsating action it has been possible to gain numerous advantages and increased efficiency as described later on.

Figure 2:
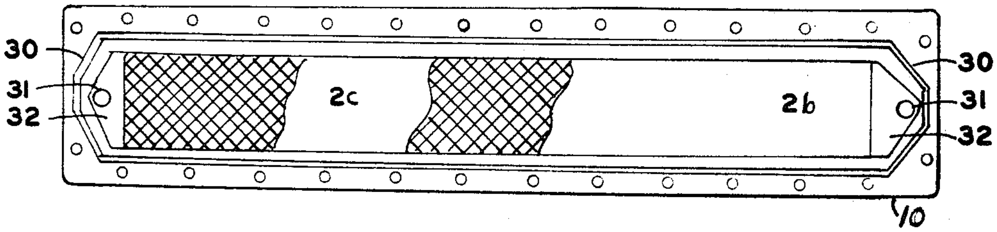
FIGURE 2 is a view of the bottom plate and FIGURES 2A–2E are detail views with several novel features for uniform, unimpeded flow of the blood.
Figure 2A:
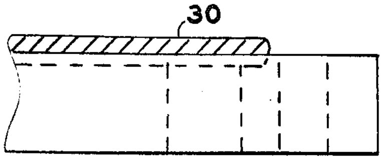
Figure 2B:
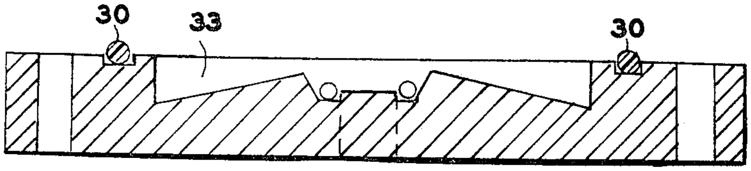

FIGURE 2 depicts other critical features of the bottom plate 10, showing several sectional views with particular reference to the unique features that have proved decisive in providing a highly effective but surprisingly simple dialysis plate, comprising (a) the exact lay of a continuous O-ring 30 placed in a contoured or series of ellipsoid turns avoiding square corners and with a minimum radius of 1 inch around the entire rigid frame depicted sectionally in FIGURE 2A, (b) inlet and outlet holes 31, (c) precision cut, bored flow bed 32 for deflecting the blood flow as it enters the plate end for its convergence as it leaves the plate shown in FIGURE 2B with a fanning or spread contour 33 that increases in depth toward the outer edge of the plate from the outlet bore sealed with an O-ring 34, (d) spreader inlet and outlet tube 35 of special design and subject of another copending application, Ser. No. 411,200, filed Nov. 16, 1964, shown in FIGURES 2D and 2E pattern plate 36 of various designs described later on, on which the semipermeable membrane rests; in between the grooving of the plate and semipermeable membrane the dialysis fluid circulates from one end of the plate to the other with a special depth grooving 37 shown in FIGURE 2E which increases the volume of dialysis fluid in relation to the flowing volume of blood.

Figures 2C, 2D, 2E:
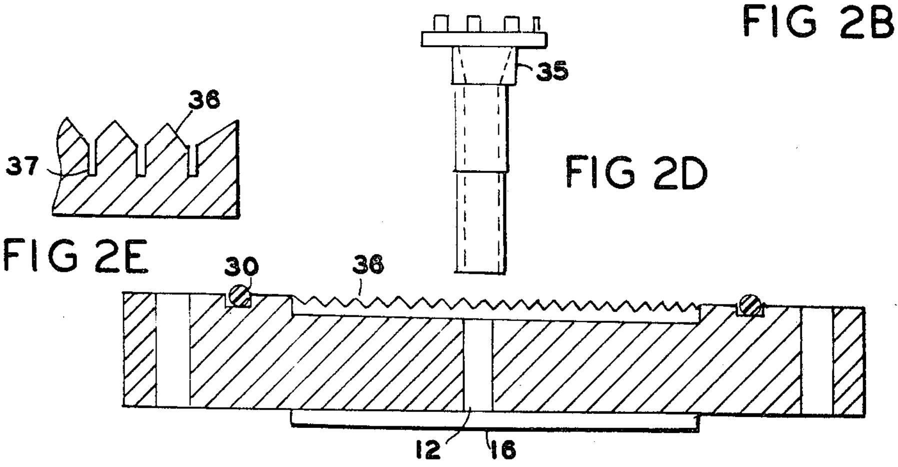
Figure 3:
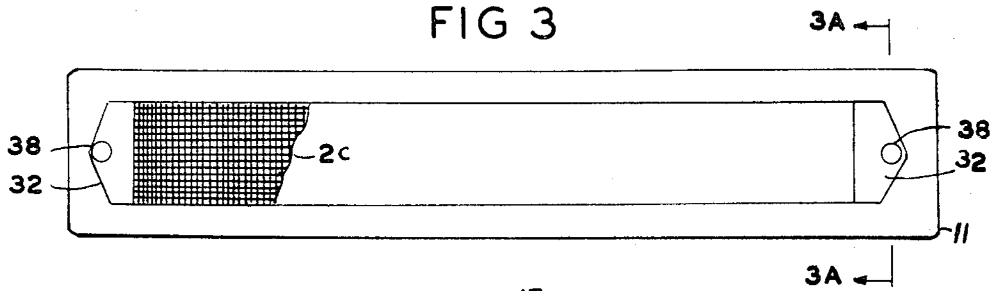
FIGURES 3, 3A and 3B are views of the top plate with a sectional view of a novel inlet and outlet device and the rippling pattern for the membrane.
Figure 3A:
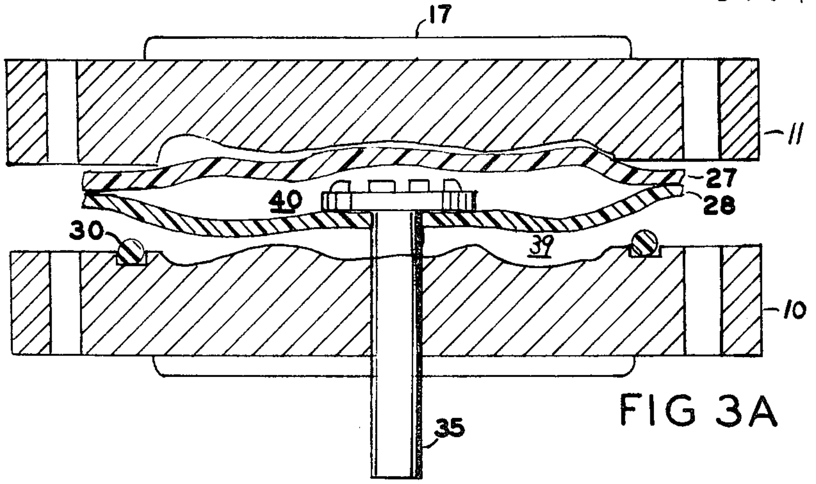
Figure 3B:
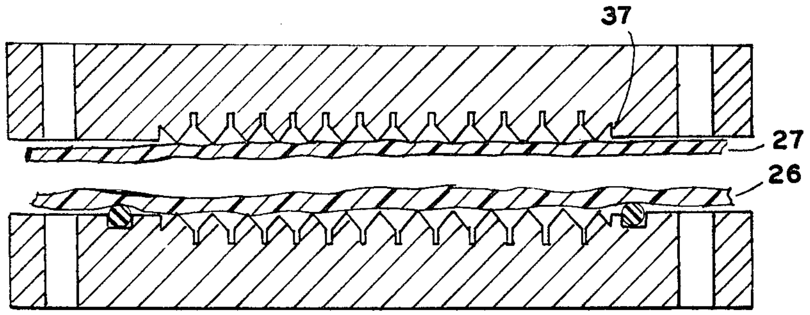

FIGURE 3 depicts the top plate 11 which is dimensionally the mirror replica of the bottom plate except with two simplifications; namely (a) it eliminates the gasket 30 and (b) has no inlet hole 31 but rather an indentation to accommodate the spreader inlet and outlet tube 35 shown in FIGURE 2D. A cross-sectional edge view of the bottom and top plates for both the entrance and exit inlet tubes is shown in FIGURE 3A. Here is provided a tapered compartment cut into the plate to permit preferential radial flow of the dialysis fluid in space 39 and of the blood compartment 40, separated by the two layers of semipermeable cellophane membranes 26 and 27. Membrane 26 has input and output connections 28, 29. Viewed at A mid-section of the two plates is shown in the diagram of FIGURE 3B in which the zig-zag pattern of the plate and the fluid grooving 37 is supporting the semipermeable membranes 26 and 27.

Figures 4, 4A:
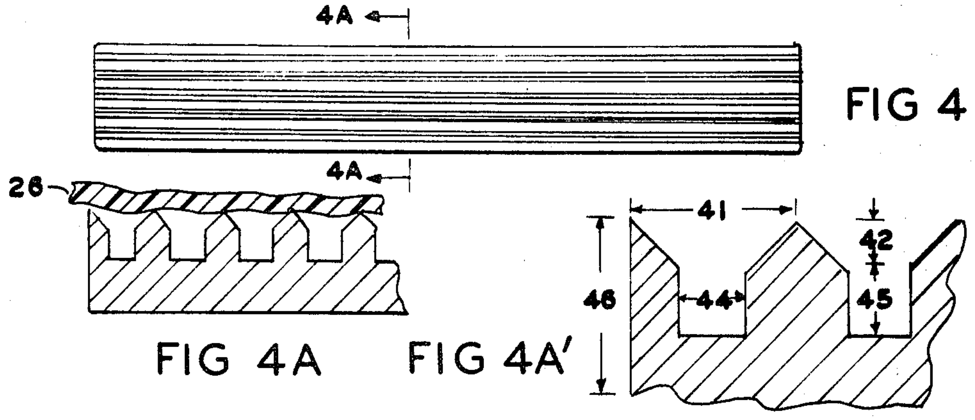
FIGURES 4, 4A–4E are views of the various rippling patterns.

In addition to the hollow construction just described as a means for inducing pulsating flow and for conserving or minimizing heat loss of the blood, this invention provides for a novel, integral and yet simple membrane pattern by means of the pattern plates 14 and 15 referred to in preceding FIGURES 1 and 2. FIGURES 4–4E now describe several variations that have provided unique effects and marked advantages in dialyzing efficiencies compared to the various parallel plates described and invented by others heretofore. Three general variations are made integral to the construction illustrated in FIGURE 4. The first of these is the parallel tubular pattern, parallel to the flow direction, shown in FIGURE 4A with critical features that spell the difference between a durable and an unreliable dialyzer, between no puncture of the membrane and frequent punctures, and between high dialysis volume which is the least expensive part of the operation and low dialysis volume. These critical features have been worked out and found to require the essential dimensions referred to numerically in FIGURE 4A in relation to the superimposed membrane 26 and in FIGURE 4A. To minimize puncture of the membrane 26 in the bottom plate, as shown in the membrane 27 in the upper plate, the peak span 41 is not greater than ⅜ of an inch nor smaller than ⅛ inch with polished peaks radiused to within 5 thousandths of an inch, while the flare depth 42 is kept to no less than ⅛ inch nor more than 3⁄16 inch and the peak angle is made to a range of 60 to 100 degrees and preferably 90° of included angle. Deviations of these critical dimensions will induce punctures, low dialysis efficiency, and low vacuum because of blockage of the groove. Next, the groove width 44 and groove depth 45 are made as generous as possible to induce maximum fluid volume to maintain maximum concentration ratio of a dialyzing solute between the blood compartment and the dialysis fluid compartment. The preferred dimensions are dependent upon the previous dimensions of 41, 42 and 43 and the thickness of the pattern plate 46, but the usual dimensions are ⅛ inch by ⅛ inch.

Figure 4B:
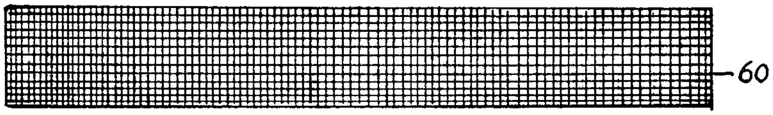

The second pattern plate 60 shown diagrammatically in FIGURE 4B, is a pyramidal one in which the cross-section of 4A is simply modified with an additional cross pattern 90° to that shown in FIGURES 4A and $4A^1$. This pattern has consistently shown as much as 50 percent, in some instances greater clearance or dialysis of urea and creatinine than the straight tubular pattern. This second criss-cross pattern imposes a noticeably higher resistance to the flow of blood; thus under an arterial systolic pressure of 140–160 mm. mercury, the resistance can reduce the blood flow through by as much as 25 percent. This finding along with visual evidence of surface turbulence, more dramatically seen when the blood is substituted by fibrous particles of fine asbestos and chopped filaments, gives a clear indication of the surprisingly good turbulence or spin of the blood suspensoids. Hence, in our invention it is often preferred to use only, a portion of the dialysis plate for the criss-cross pattern.

Figure 4C:
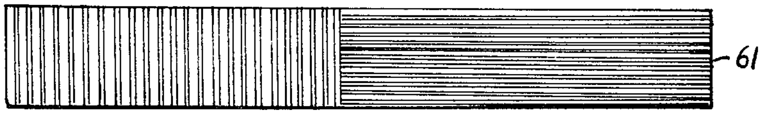

The third plate 61 pattern, shown diagrammatically in FIGURE 4C, is a combination of the parallel groove design shown in right portion of FIGURE 4A and the criss-cross one shown in the left potrion of FIGURE 4B. This combination is most frequently in our current clinical dialysis as there is evidence that the best clearance rate of the criss-cross pattern, believed to be due to boundary or surface turbulence inducing deaggregating the blood cells and other cellular clumps, can be combined with the higher ultrafiltration rate of the parallel grooved section where the cellular components begin to rearrange in their natural aggregated state and, quite surprising, tend to congregate in the center of the groove, hence exposing the plasma fluid to the ultrafiltering action. This combination of effects has been most surprising to us as we assessed the scores of clinical dialysis using all three types of plates discussed so far.

Figure 4D:
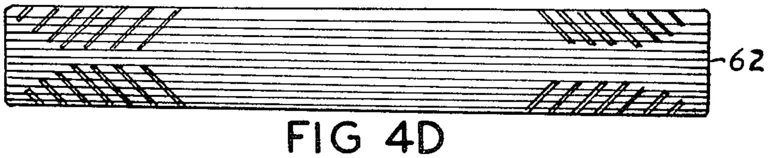
Figure 4E:
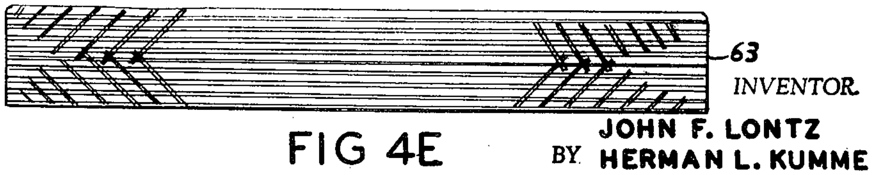

Another novel yet valuable modification is plate 62 in which diagonal criss-cross patterns are cut in groove form just as shown in FIGURES 4A and 4A[1] and depicted in FIGURE 4D. In this pattern the blood entering from the left side, for example, is made to move to the edge of the plate by virtue of diagonal depressions imposed on the membrane especially as the vacuum is increased; in this way the maximum surface area of the membrane is subjected to the dialyzing action. This pattern is replicated in the reverse manner at the blood exit or discharge end, where it now serves to gather the blood away from the sides of the plate where it may tend to stagnate especially if the blood film thickness gets down to a matter of a thousandth of an inch and gradually acquires a higher hematocut value from prolonged stagnation. Although the preferred spacing of the plate is set to provide a generous interplate clearance up to an average of twenty thousandths of an inch and much higher, nevertheless occasional handling, loading and modified film thickness can inadvertently lead to the low side of this film thickness that would restrict some flow. Hence, the diagonal cut is particularly useful when the blood is rinsed out at the end of the dialysis by sterile intravenous fluids, such as dextrose, saline, Ringer's lactate solution and the like that normally have a much lower viscosity than the blood; with these low viscosity solutions the flow narrows preferentially through the middle portion of the plate without the diagonal grooving shown in FIGURE 4D. There are a number of ways in which the geometrical pattern of the diagonal grooves are imposed. It is adequate to space them approximately one inch apart in a fluted manner shown in FIGURE 4D extended to about one-fourth to one-third of the area lengthwise leaving a middle section in the straight parallel grooved form. The preferred angle of the diagonal ranges from 60 to 30 degrees and they can also be made to overlap by extending across the mid section as shown in FIGURE 4E in plate 63.

Figure 5A:
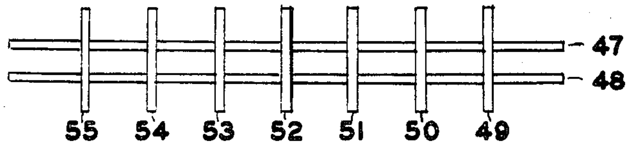
FIGURES 5A, 5B, 5C are views of the rib arrangements for the hollow plates.
Figure 5B:
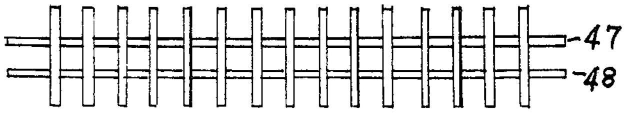
Figure 5C:
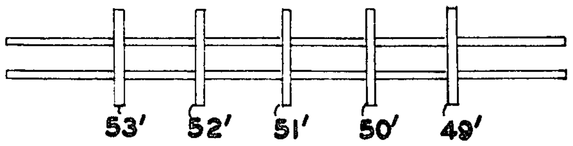

Another critical part of this invention is the incorporation of a ribbed structure 13 in the hollow portion of the plate serving more than just a mere insulating construction or as a heat trap. The ribbed structure shown diagrammatically in FIGURES 5A–5B and 5C show a critical balance of rigidity on the one hand and a deflective resilience in the integral sections. FIGURE 5A shows a three length corridor, extending from one end of the plate to the other, using 2 parallel lengthwise ribs 47, 48 spaced 3 to 4 inches apart. FIGURE 5A shows seven lateral ribs 49, 50, 51, 52, 53, 54 and 55 one-half inch thick in a 48 inch lengthwise span providing approximately 6 inches exclusive of the rib width in equal segments. These can be further compartmented with longitudinal ribs spaced 3 to 4 inches apart as shown in FIGURE 5B to provide even a more rigid structure. The resulting compartments provide a flexing area which can be made to move up and down as the dialyzer pump is made to draw the dialysis fluid under a gauge vacuum up to 700 millimeters mercury having a fluctuating pulsatile action with a pressure amplitude of 50 to 100 mm. mercury vacuum at a rate or frequency from about 6 to 120 cycles per minute, but usually in the range of 10 to 20 cycles per minute. Alternately, the sections are made to maximize the deflection by reproportionating the lengthwise sections as shown in FIGURE 5C in which 5 lateral ribs 49[1], 50[1], 51[1], 52[1] and 53[1] are emplaced in varying increments approximating deflections calculatable from usual beam flexing formulae. The ribs, both lateral and longitudinal, are made in thicknesses from ⅛ to ⅜ inch spanning the hollow section by ¼ to ⅛ inch. The lateral ribs are sealed or cemented first, as our preference, and then the longitudinal are emplaced. Each of the ribs is provided with small breather holes usually ¹⁄₁₆ inch in diameter to permit complete interconnection between the various compartments. This supporting structure of the present invention limits the stretching of the membranes to a small fraction of their yield strength namely about 10%.

Figure 6:
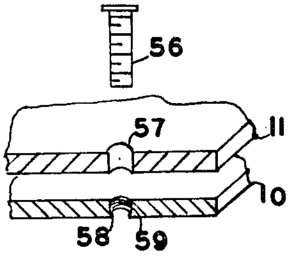
FIGURE 6 is a detail view.

Having now described the essential and critical details of the above invention, the components are assembled as follows:

The bottom plate 10 is scrubbed clean of dirt and any contaminant and over it is placed a precut sheet, extending beyond the gasket line, of a semipermeable membrane 26. A circular hole is cut on the membrane over the inlet and outlet slots 31 at each of the two ends of the plate and the spreader inlet and outlet tube 35 shown in FIG. 2D is inserted and secured tight for leakproofness by means of the tightening screw located at the bottom of the plate. A second top layer of similar membrane, precut to extend beyond the gasket line, is placed over the first or bottom layer. The top plate 11 is then superimposed over the bottom plate and the two plates closed and locked by means of screws 56, as shown in FIGURE 6, inserted through oversized bored holes 57 illustrated as a half cut-through for descriptive purposes and engaged into the bottom plate 10 by means of a double threaded, self-threading steel bushing 58 bored into the bottom hole 59. The resulting bolting for the entire plate is spaced approximately 3–4 inches around the entire plate just beyond the gasket line, with closer spacing at the end sections of the plate.

Figure 7:
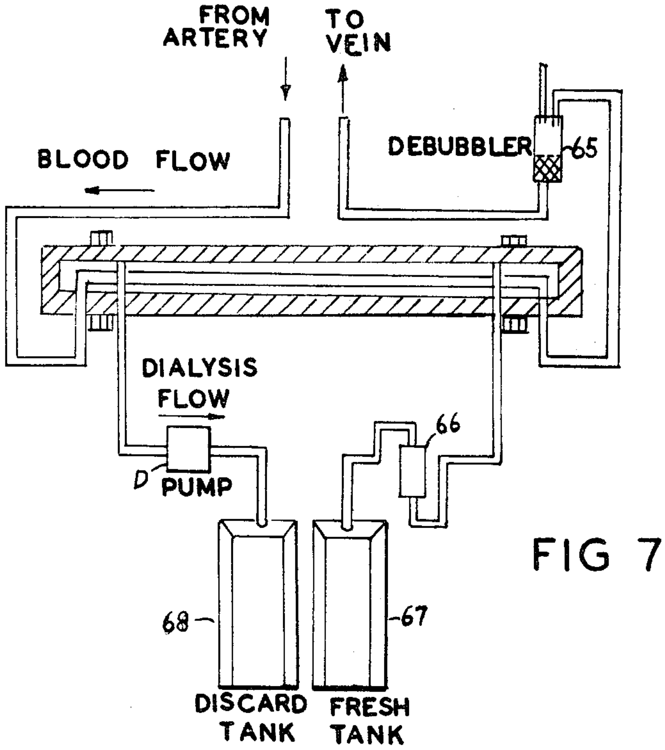
FIGURE 7 is a schematic diagram of the system.

Having now assembled the plate which usually takes only about 2 to 5 minutes with no demanding skill, the necessary tubing for the blood line and the dialyzing line is installed with various mechanical features shown schematically in FIGURE 7 that include a pump for circulating a sterilizing solution and a debubbler 65 in the case of blood return, and in the case of the dialysis line, the manifolds of the plate, dialysis pump, flow meter 66 and the tanks 67 and 68 for the fresh electrolyte and waste or discard. The blood line is next circulated with a disinfecting, sterilizing solution preferably 1:500 of refined alkyl dimethylbenzyl ammonium chlorides, known commercially as Zephiran chloride (Winthrop Laboratories) by pumping for approximately five to ten minutes. The sterilizing solution fills the entire blood line including the debubbler; the inlet and outlet tubing used for the blood line is kept in the circulating sterilizing solution kept in a bottle well covered with gauze to prevent bacterial contamination. The plate is then stored for use on demand for hemodialysis. Meanwhile, the dialysis line is filled with saline or tap water that need not be sterilized but should be clean and free of any sediment. During storage the dialysis tubing is closed off just beyond the manifold inlet as otherwise the sterilizing solution will slowly filter through the membrane into the dialysis solution tanks.

Just prior to use with a patent the sterilizing solution is rinsed out with 2 to 3 gallons of sterile saline using the arterial line to draw the rinsing fluid and the venal line for discarding. A test is usually made with an appropriate indicator to ensure that the last traces of the germicide are removed. Next, the plate assembly is primed by whatever physiologically compatible sterile solution may be required or directed by the attending clinician; this may include normal saline, glucose, etc. When the connection is made to the patient having been previously prepared surgically with proper artery-vein cannulation, the priming contents of the dialyzer can be used entirely or partly to complete the extracorporeal circulation. On completion of the required hemodialysis, the artery line is disconnected first from the patient and covered with a sterile filter gauge, while the blood contained in the plate is pumped out by reinstalling the blood line into the pump used for sterilization to propel the blood through the debubbler to return as much of it as possible to the patient. In the assembled dialysis plate of this invention, the usual range of plate-contained blood, or trapped volume, ranges from 140 to 280 cubic centimeters including contents of the tubing. With care all but 25 to 50 cc. can be recovered as returned to the patient.

For the hemodialysis, the dialysis solution is made up according to the usual formulations of electrolytes and sugar that have been published extensively. For routine hemodialysis with patients afflicted with various uremic problems, it is preferred to have three, carefully weighed and rechecked chemical formulations ready to be dissolved in the 5 gallon (18.93 liter) plastic jerry cans that are also provided with 5, 10, 15 and 20 liter markings. These three groups include the following:

| Chemical | Formula | Meq./L. (NB) | Grams per 20 L. |
|---|---|---|---|
| Group A: | | | |
| Sodium chloride | $NaCl$ | 112.9 | 114.0 |
| Sodium bicarbonate | $NaHCO_3$ | 26.8 | 45.0 |
| Group B: | | | |
| Calcium chloride | $CaCl_2$ | 1.80 | 4.00 |
| Magnesium chloride hexahydrate. | $MgCl_2 \cdot 6H_2O$ | 1.50 | 6.10 |
| Dextrose (d-glucose) anhydrous. | $C_6H_{12}O_6$ | ------------ | 20.0 |
| Group C: | | | |
| Potassium chloride (a) | $KCl$ | 4.0 | 5.96 |
| Potassium chloride (b) | $KCl$ | 2.0 | 2.93 |
| Group D: | | | |
| Lactic acid (85%) (a) | $C_3H_6O_3$ to adjust pH | | |
| Gluconic acid (b) | $C_5H_6(OH)_5CO_2H$ to adjust pH | | |

(NB) Milliequivalents per liter of dialysis solution.

Group A is dissolved first within the first two gallons of water adjusted to a temperature between 40 and 42 degrees centigrade, which in the plastic tank drifts down to 36 degrees in one to two hours. Next, as prescribed Group C is added: (a) usually with severely hyperkalemic (excess potassium in patient's serum) cases this is eliminated from the formula or used at the indicated half concentration (b) where complete depletion of the potassium may be too risky and induce digitoxin shock. Depending upon the pH of the completed solution with the particular water used, Group D is added for the purpose of adjusting the pH to 7.37 and may often be eliminated in highly acidotic cases. Finally Group B is added preferably after the lactic or gluconic acid of Group D to minimize the precipitation of the calcium. These are only typical of the procedures employed but are described to illustrate the flexibility of the once-through dialysis discarding system; the reason for this is that as the progress of the hemodialysis is checked to correct the unbalanced electrolyte concentration in the patient's serum, the successive dialysis solutions are made up to approximate the normal electrolyte levels by virtue of the relatively small volume (18.93 liters) involved. Also, tracings of the electrocardiograph for progress in the lowering of the serum potassium of the patient are examined periodically so that a new, fresh stock of normal or near-normal potassium level can be placed into the dialysis circuit in a matter of minutes when, for example, the half load of potassium (Group C(b)) is used or had been eliminated initially.

A complete assembly of the foregoing described dialysis plate can be constructed from a variety of structural materials including plastics, stainless steel, chrome or nickel-finished metal, or special grades of aluminum. The preferred basic material is any transparent or semitransparent structural plastic such as polymethyl methacrylate, polycarbonate, polysytrene, and the like with nece sary strengthening done with steel or metal reinforcement. The most preferred is the structural grade of polymethacrylate plastic because of the ease with which it can be cemented to provide for the numerous component structures just described. The acrylic further is preferred for its transparent quality enabling the operator to see any defective loading of the membranes after they have been clamped and closed into position and any ineffective flow of the blood caused by improper loading or closure. Alternatively, it may be desirable to use the acrylic construction for the top half with the lower half made of steel or aluminum which are readily amenable to inexpensive stamping process to provide the patterns shown in FIGURE 4. For the closures, it is preferred to use bolts made of stainless steel or heavily chrome plated mild steel bolts to assure resistance to the corrosive action of the saline and other solutions used clinically with the plate. All tubing and flow lines connecting from the patent to the plate and then back to the patent are made of conventional, medical grade polymers or resins, notably polyvinyl chloride or polysiloxane.

While the dialyzer has been described as particularly applicable to hemodialysis, it is intended to include both patient shunted in vivo as well as in vitro dialysis of blood and other physiological fluids. Thus the dialyzer has been used effectively with bank blood to readjust the electrolyte content by removing all or part of the potassium and by supplementing the calcium level using appropriate dialysis solutions. Although the invention and descriptions specified the use with blood, it is not intended that such be the limiting factor. Other nonphysiological suspensions and fluids can be equally dialyzed or dehydrated by ultrafiltration with suction, or subjected to both of these, to remove undesired electrolytes or soluble organic components. The dialyzer has been successfully used as an oxygenator either entirely or in combination with dialysis. This is done simply by replacing one or both of the semipermeable dialyzing membranes usually cellophane, with ultrathin films of polytetrafluoroethylene and polysiloxane. In this case the dialysis fluid compartment is simply connected to an oxygen source, usually a 95/5 or 90/10 mixture of oxygen and carbon dioxide bubbled over water, thus capable of functioning as a heart-lung device. The dialyzer has been also successfully used in combination with oxygenation in which only one of the semipermeable membranes was replaced by ultrathin polytetrafluorethylene film, especially where a vein-to-vein instead of an artery-to-vein shunt is necessary thereby enabling one to oxygenate the venal blood where it may be desirable to maintain arterial level of oxygen in certain extracorporeal perfusion.

From the foregoing descriptions and accompanying figures, it will be apparent that this invention provides a novel arrangement of a hemodialyzing device designed to provide a maximum surface to volume ratio with minimal impedance to the flow of blood thus allowing it to operate as a pumpless dialyzer in an autogeneous physiological system. Additionally, the invention provides a novel and efficient parallel plate with specific and precise arrangement of enclosures that obviate stagnant retention of blood in distant corners and ends. Furthermore, the design is such that various degrees of disruption of the flowing blood stream are incorporated to assure efficient removal of toxic materials from the blood by applying minimal degree of spreading and deaggregating the blood suspensoids.

An example of a hemodialyzer constructed for safe and efficient clinical use with patients requiring either dialysis or ultrafiltration to relieve the symptoms of renal (kidney) failure is one in which the grooved plate is provided with eight grooves per inch at a depth of one-quarter of an inch using cambered or rounded peaks and grooves to eliminate point projections and pointed grooves. These are accomplished by simply polishing the peaks and grooves with usual grades of emery and polishing cloths to impose radial contours. The point projections are reduced to a camber radius of approximately $\frac{1}{64}$ inch more or less while the groovings are similarly modified. Tests have shown that the reduction of the pointed or lined peaks eliminate the rupture of the gel dialysis-membranes, while the similar grooved-polishing eliminates the fracture of plates during pulsations by converting the point or line stress concentrations to rounded and hence to widely distributed areas of flexural stress. Another example of the grooving imposed on successful, clinical dialyzers made of acrylic resin, includes groovings of ten per inch with $\frac{3}{16}$-inch deep grooving. And still another example is using four grooves per inch with $\frac{3}{8}$-inch deep grooves. The usual range suited for cellophane is from 4 to 10 grooves per inch at depths of one eighth to three eighths inch.

We claim:

1. An extracorporeal hemodializing device comprising in combination at least one pair of plates, said plates having a parallel plate arrangement,
   - a pair of semipermeable membranes mounted between each of said plates forming a flattened horizontal film blood compartment confined between said pair of semipermeable membranes,
   - means connected to provide arterial pressurized blood flow between said membranes,
   - means to pass dialyzing fluid between said membranes and said plates, said blood compartment providing a surface-to-volume ratio between 20 and 200 square centimeters of dialyzing surface to each cubic centimeter of blood,
   - said plates having differently grooved portions, one portion having parallel grooves on the membrane side thereof, arranged in an oblique direction to grooves parallel to the flow of blood in a spaced array and the other portion having only grooves parallel to the flow of blood, said portions permitting a safe strain of the membranes when the membranes are forced in an undulating manner by the flow of the blood,
   - a plurality of rigid struts, said grooved plates supporting said rigid struts within said spaces thereby forming a hollow enclosure with a plurality of compartments rendered resilient to pulsating action of the dialysis fluid,
   - and means to pump said dialysis fluid to a pressure difference of up to 700 millimeters mercury gauge vacuum, being equally spaced from four to ten per inch and having a depth of one eighth to three eighths of an inch.

2. Apparatus as in claim 1 wherein said strain of the membranes is limited to about 10% of the membrane yield strength.

References Cited

UNITED STATES PATENTS 3,332,746 7/1967 Claff et al. -------- 210—321 X

REUBEN FRIEDMAN, *Primary Examiner.*

F. SPEAR, *Assistant Examiner.*